United States Patent
Ogasa

(10) Patent No.: US 9,153,838 B2
(45) Date of Patent: Oct. 6, 2015

(54) LITHIUM ION CONDUCTIVE INORGANIC SUBSTANCE

(75) Inventor: Kazuhito Ogasa, Kanagawa (JP)

(73) Assignee: OHARA INC. (JP)

( * ) Notice: Subject to any disclaimer, the term of this patent is extended or adjusted under 35 U.S.C. 154(b) by 412 days.

(21) Appl. No.: 13/482,324

(22) Filed: May 29, 2012

(65) Prior Publication Data
US 2012/0308900 A1    Dec. 6, 2012

(30) Foreign Application Priority Data
May 30, 2011    (JP) ................................. 2011-120954

(51) Int. Cl.
H01M 10/052    (2010.01)
H01M 10/0562    (2010.01)
H01B 1/12    (2006.01)

(52) U.S. Cl.
CPC .............. *H01M 10/052* (2013.01); *H01B 1/122* (2013.01); *H01M 10/0562* (2013.01); *H01M 2300/0068* (2013.01); *H01M 2300/0071* (2013.01); *H01M 2300/0091* (2013.01); *Y02E 60/122* (2013.01)

(58) Field of Classification Search
CPC .......................... H01M 10/052; H01M 10/0562
See application file for complete search history.

(56) References Cited

U.S. PATENT DOCUMENTS 6,485,622 B1    11/2002    Fu
2011/0053002 A1    3/2011    Yamamura et al.

FOREIGN PATENT DOCUMENTS

| EP | 1088796 A1 | 4/2001 |
| EP | 2317596 A1 | 4/2011 |
| JP | 2000-034134 A | 2/2000 |
| JP | 2007-134305 A | 5/2007 |
| JP | 2010-192313 A | 9/2010 |
| JP | 2011-073962 A | 4/2011 |
| JP | 2011-096475 A | 5/2011 |

OTHER PUBLICATIONS

Salkus, T., et al., "Synthesis, Structure, and Electric Properties of Li1+xScxZr2-x(PO4)3 (x=0.1, 0.2, 0.3) Ceramics", Lithuanian Journal of Physics, vol. 46, No. 3, pp. 361-366 (2006).
Notice of Reasons for Rejection issued to JP Application No. 2011-120954, mailed Jul. 15, 2014.

*Primary Examiner* — Helen O Conley
(74) *Attorney, Agent, or Firm* — Cantor Colburn LLP

(57) ABSTRACT

To provide a lithium ion conductive inorganic substance that makes it possible to further enhance the charge-discharge voltage of batteries and to further improve the charge-discharge properties of batteries. The lithium ion conductive inorganic substance includes a $ZrO_2$ component from 2.6% to 52.0% by mass on an oxide basis. The lithium ion conductive inorganic substance is preferably used for lithium ion secondary batteries that have a positive electrode layer, a negative electrode layer, and a solid electrolyte layer intervening between the positive electrode layer and the negative electrode layer.

11 Claims, 3 Drawing Sheets

COMPOSITION OF $Li_{1.4+0.06x}Al_{0.2}Ti_{(1.8-x)}Zr_{0.94x}Y_{0.06x}Si_{0.2}P_{2.8}O_{12}$

COMPOSITION OF $Li_{1.4+0.06x}Al_{0.2}Ti_{(1.8-x)}Zr_{0.94x}Y_{0.06x}Si_{0.2}P_{2.8}O_{12}$

COMPOSITION OF $Li_{1.4+0.06x}Al_{0.2}Ti_{(1.8-x)}Zr_{0.94x}Y_{0.06x}Si_{0.2}P_{2.8}O_{12}$

COMPOSITION OF $Li_{1.4+x}Al_{0.2}Zr_{1.8-x}Y_xSi_{0.2}P_{2.8}O_{12}$

COMPOSITION OF $Li_{1.3+x}Al_{0.2}Zr_{1.7}Y_{0.1}Si_xP_{3-x}O_{12}$

LITHIUM ION CONDUCTIVE INORGANIC SUBSTANCE

This application is based on and claims the benefit of priority from Japanese Patent Application No. 2011-120954, filed on 30 May 2011, the content of which is incorporated herein by reference.

BACKGROUND OF THE INVENTION

1. Field of the Invention

The present invention relates to a lithium ion conductive inorganic substance, in particular to a lithium ion conductive inorganic substance which is favorably used for solid electrolytes of lithium ion secondary batteries, partition walls of lithium air batteries and lithium seawater batteries, etc.

2. Related Art

All-solid batteries, using an inorganic solid electrolyte and not using organic substance even in electrodes, are free from worries about leakage of organic electrolyte or gas generated from organic electrolyte, and therefore are expected to be safe batteries. The all-solid batteries are less likely to induce a side reaction other than battery reactions compared to liquid batteries, and therefore are expected to have a longer operating life compared to liquid batteries.

In an example of the all-solid batteries, a positive electrode layer and a negative electrode layer are respectively laminated and sintered on both sides of a solid electrolyte layer, and an inorganic substance with lithium ion conductivity is used as a solid electrolyte which is included in the solid electrolyte layer, the positive electrode layer, and the negative electrode layer.

In addition, lithium air batteries and lithium seawater batteries, where a lithium compound is used at negative electrode side and a catalyst is disposed at positive electrode side, are in principle not limited for their capacity by their positive electrodes; therefore, it is expected that smaller batteries with larger capacity can be formed therefrom. Lithium ion conductive inorganic substances are also used in partition walls of the lithium air batteries and lithium seawater batteries.

Here, Patent Document 1 discloses a lithium ion secondary battery using a glass ceramics that contains a crystal with a crystal structure the same as that of LATP ($Li_{1.3}Al_{0.3}Ti_{1.7}(PO_4)_3$) crystal, as a lithium ion conductive inorganic substance to construct a solid electrolyte layer in order to enhance ion conductivity and chemical stability of the solid electrolyte layer.

Patent Document 2 also discloses a lithium air battery using a glass ceramics that contains LATP ($Li_{1.3}Al_{0.3}Ti_{1.7}(PO_4)_3$) as a lithium ion conductive inorganic substance to construct a partition wall in order to enhance ion conductivity and chemical stability of the partition wall (waterproof layer).

Non-Patent Document 1 also discloses a lithium ion secondary battery using an inorganic substance where a portion of the Li in LZP ($LiZr(PO_4)_3$) with a crystal structure different from that of LATP is substituted with Sc as a lithium ion conductive inorganic substance to construct the solid electrolyte.

Patent Document 1 Japanese Unexamined Patent Application, Publication No. 2007-134305
Patent Document 2 Japanese Unexamined Patent Application, Publication No. 2010-192313
Non-Patent Document 1 T. Salkus, and five others, "Synthesis, structure, and electric properties of $Li_{1+x}Sc_xZr_{2-x}(PO_4)_3$ (x=0.1, 0.2, 0.3) ceramics", Lithuanian Journal of Physics, 2006, vol. 46, No. 3, pp. 361-365.

SUMMARY OF THE INVENTION

However, there has been a problem in the lithium ion secondary battery disclosed by Patent Document 1 and the lithium air battery disclosed by Patent Document 2 that charge-discharge voltage thereof cannot be enlarged since the lithium ion conductive inorganic substance is likely to decompose. Furthermore, the lithium ion secondary battery disclosed by Non-Patent Document 1 is insufficient for the ion conductivity of the lithium ion conductive inorganic substance; and thus for lithium ion secondary batteries, further improvements have been required in charge-discharge properties.

The present invention has been made in view of the problems described above; and it is an object of the present invention to provide a lithium ion conductive inorganic substance which makes possible to further enlarge the charge-discharge voltage of batteries and to further improve charge-discharge properties of batteries.

The present inventors have found that by way of including a $ZrO_2$ component into a lithium ion conductive inorganic substance in a predetermined range of contents, the lithium ion conductive inorganic substance becomes resistant to undergoing reductive decomposition while having a crystal structure similar to that of LATP ($Li_{1.3}Al_{0.3}Ti_{1.7}(PO_4)_3$) having a high electrical conductivity, thereby completing the present invention.

The first aspect of the invention is a lithium ion conductive inorganic substance that includes a $ZrO_2$ component from 2.6% to 52.0% by mass on an oxide basis.

The second aspect of the present invention is a lithium ion conductive inorganic substance according to the first aspect, wherein the lithium ion conductive inorganic substance is a glass ceramic.

The third aspect of the present invention is a lithium ion conductive inorganic substance according to the first aspect, wherein the lithium ion-conductive inorganic substance is a ceramic.

The fourth aspect of the present invention is a lithium ion conductive inorganic substance according to any one of the first to third aspects further including a crystalline phase of $Li_{1+x+z}M_xA_{2-x}P_{3-z}Si_zO_{12}$ ($0<X\le1$, $0<Z<1$, M: at least one selected from Al, Sc, Y, Ga, and La, and A: at least one selected from Ti, Zr, Ge, and Sn).

The fifth aspect of the present invention is a lithium ion conductive inorganic substance according to any one of the first to fourth aspects further including a $Li_2O$ component from 3.0% to 9.5%, a $P_2O_5$ component from 24% to 55%, an $AO_2$ component from 21% to 51%, and a $M_2O_3$ component greater than 0% to 24% by mass on an oxide basis (A: at least one selected from Zr, Ti, Ge, and Sn, and M: at least one selected from Al, Y, Sc, Ga, and La).

The sixth aspect of the present invention is a lithium ion conductive inorganic substance according to any one the first to fifth aspects, wherein the content of an $SiO_2$ component is no greater than 18% by mass on an oxide basis.

The seventh aspect of the present invention is a lithium ion conductive inorganic substance according to any one the first to sixth aspects, wherein a mass ratio on an oxide basis of $Y_2O_3/(ZrO_2+Y_2O_3)$ from 0.001 to 0.14 or $Sc_2O_3/(ZrO_2+Sc_2O_3)$ from 0.001 to 0.10 is satisfied.

The eighth aspect of the present invention is a lithium ion conductive inorganic substance according to any one the first to seventh aspects, wherein a lithium ion conductivity at 25° C. is no less than $1.0 \times 10^{-8}$ S·cm$^{-1}$.

The ninth aspect of the present invention is a lithium ion conductive inorganic substance according to any one the first to eighth aspects, wherein a potential with respect to Li at 25° C. is no less than 0.3 V and no greater than 1.5 V and a current density of a reduction current is less than 10 µA/cm$^2$.

The tenth aspect of the present invention is a lithium ion secondary battery that includes a positive electrode layer, a negative electrode layer, and a solid electrolyte layer that intervenes between the positive electrode layer and the negative electrode layer, and that comprises a solid electrolyte formed from the lithium ion conductive inorganic substance according to any one of the first to ninth aspects.

The eleventh aspect of the invention is a solid electrolyte used for primary batteries or secondary batteries that has a thickness from 0.5 µm to 1000 µm and includes the lithium ion conductive inorganic substance according to any one the first to ninth aspects.

In accordance with the present invention, there can be provided a lithium ion conductive inorganic substance that makes possible to further enlarge charge-discharge voltage of batteries and to further improve charge-discharge properties of batteries.

DETAILED DESCRIPTION OF THE INVENTION

Figure 1:
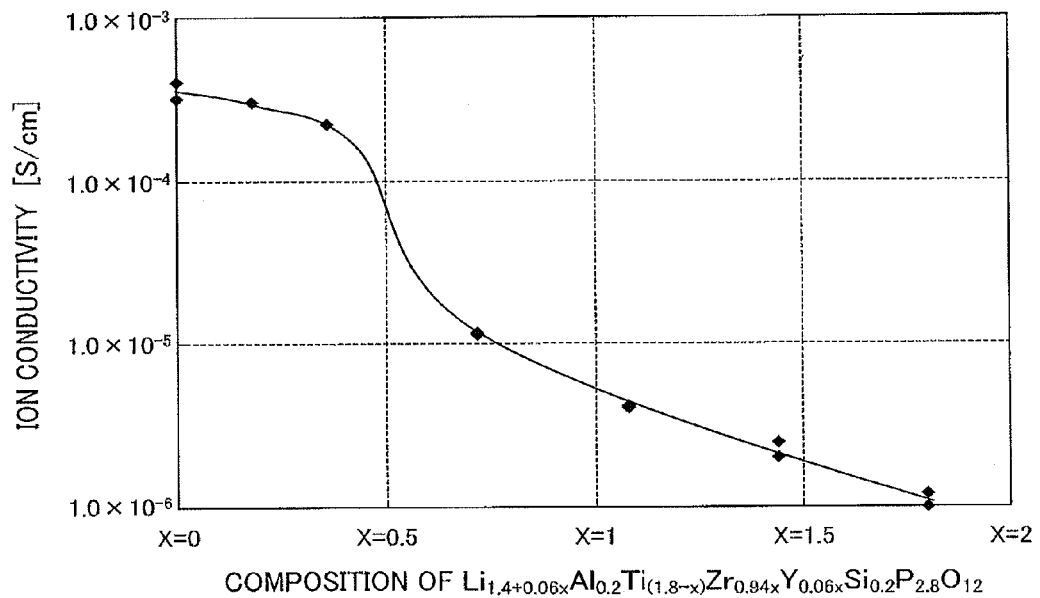
FIG. 1 is a graph that shows a composition dependence of ion conductivity in a case where Ti included in a lithium ion conductive inorganic substance is substituted with 6 mol % of and 94 mol % of Zr.

The lithium ion conductive inorganic substance of the present invention includes the $ZrO_2$ component from 2.6% to 52.0% as a constitutional component. By way of including the $ZrO_2$ component into the lithium ion conductive inorganic substance within a predetermined content range, the lithium ion conductive inorganic substance becomes resistant to undergoing reductive decomposition and thus electronic conduction through decomposition products can be reduced. At the same time, the potential window of lithium ion secondary batteries, lithium air batteries, or lithium seawater batteries can be expanded. Accordingly, a lithium ion conductive inorganic substance that makes it possible to further improve the charge-discharge voltage of batteries and to further improve the charge-discharge properties of batteries can be provided.

Hereinafter, the lithium ion conductive inorganic substance of the present invention is explained in detail with respect to the embodiments thereof. The present invention is not limited to the embodiments below and may be carried out by appropriately making a change within the scope of the invention. In addition, repeated explanations are occasionally omitted as appropriate, but this does not limit the scope of the invention.

The contents of components in the lithium ion conductive inorganic substance of the present invention are expressed in terms of mass percent on an oxide basis unless indicated otherwise. Here, "composition on an oxide basis" refers to a composition of components in the lithium ion conductive inorganic substance assuming that oxides, complex salts, metal fluorides, etc. used as raw materials of the lithium ion conductive inorganic substance are entirely decomposed into oxides and the total mass of the generated oxides corresponds to 100% by mass.

Lithium Ion Conductive Inorganic Substance

Here, the lithium ion conductive inorganic substance includes the $ZrO_2$ component from 2.6% to 52.0% as mass percent on an oxide basis. Thereby, the lithium ion conductive inorganic substance becomes resistant to undergoing reductive decomposition and thus electronic conduction through decomposition products can be reduced. For this reason, batteries with a higher voltage during charge-discharge can be obtained even having improved charge-discharge properties.

More preferably, the lithium ion conductive inorganic substance includes a $Li_2O$ component from 3.0% to 9.5%, a $P_2O_5$ component from 24% to 55%, an $AO_2$ component from 21% to 51%, and a $M_2O_3$ component greater than 0% to 24% by mass on an oxide basis (A: at least one selected from Zr, Ti, Ge, and Sn, and M: at least one selected from Al, Y, Sc, Ga, and La). Thereby, the $Li_2O$ component, the $AO_2$ component, and the $P_2O_5$ component are included as essential components, thus crystals with ion conductivity similar to that of LATP ($Li_{1.3}Al_{0.3}Ti_{1.7}(PO_4)_3$) having a high electrical conductivity may be promoted in the lithium ion conductive inorganic substance, and also the crystal structure thereof is likely to exist stably; consequently, the ion conductivity of the lithium ion conductive inorganic substance can be enhanced.

Hereinafter, the constitutional components of the lithium ion conductive inorganic substance and properties of the lithium ion conductive inorganic substance are explained.

$ZrO_2$ is an essential component for crystals with lithium ion conductivity and can make the lithium ion conductive inorganic substance resistant to undergoing reductive decomposition. In particular, by including 2.6% or more of $ZrO_2$, electronic conduction due to decomposition of the lithium ion conductive inorganic substance can be reduced. Therefore, the lower limit of the content of $ZrO_2$ is preferably 2.6%, more preferably 10.0%, and most preferably 20.0%. On the other hand, by adjusting the content of $ZrO_2$ to 52.0% or less, generation of crystalline phase of $Li_{1+x+z}M_xA_{2-x}P_{3-z}Si_zO_{12}$ can be promoted. Therefore, the upper limit of the content of $ZrO_2$ is preferably 52.0%, more preferably 47.0%, and most preferably 45.0%.

$Li_2O$ is an essential component that imparts the lithium ion conductive inorganic substance with lithium ion conductivity. Therefore, the lower limit of the content of $Li_2O$ is preferably 3.0%, more preferably 3.5%, and most preferably 4.0%. On the other hand, by adjusting $Li_2O$ to 9.5% or less, the chemical durability of the lithium ion conductive inorganic substance can be enhanced and thus the morphological stability of batteries can be enhanced. Therefore, the upper limit of the content of $Li_2O$ is preferably 9.5%, more preferably 9.0%, and most preferably 8.5%.

$P_2O_5$ is an essential component to form the crystalline phase of $Li_{1+x+z}M_xA_{2-x}P_{3-z}Si_zO_{12}$. Therefore, the lower limit of the content of $P_2O_5$ is preferably 24%, more preferably 31%, and most preferably 45%. On the other hand, by adjusting $P_2O_5$ to 55% or less, the formation of other crystalline phases or glass phases can be suppressed and thus a decrease of the lithium ion conductivity of the formed crystal to be hindered. Therefore, the upper limit of the content of $P_2O_5$ is preferably 55%, more preferably 53%, and most preferably 51%.

$AO_2$ (A: at least one selected from Zr, Ti, Ge, and Sn) is an essential component to promote crystallization of the lithium ion conductive inorganic substance. Therefore, the lower limit of the content of $AO_2$ is preferably 21%, more preferably 26%, and most preferably 36%. On the other hand, by adjusting $AO_2$ to 42% or less, a decrease of the lithium ion conductivity of the crystal to be formed can be hindered. Therefore, the upper limit of the content of $AO_2$ is preferably 51%, more preferably 49%, and most preferably 42%.

$M_2O_3$ (M: at least one selected from Al, Y, Sc, Ga, and La) is a component that can control the ion conductivity of the crystal through partial exchange with the $AO_2$ component of the formed crystal and can also control of mechanical strength of the crystal. Therefore, the lower limit of the content of $M_2O_3$ is preferably greater than 0%, more preferably 2%, and still more preferably 5%. On the other hand, by adjusting $M_2O_3$ to 24% or less, the formation of other crystalline phases or glass phases can be suppressed and thus a decrease of the ion conductivity of the lithium ion conductive inorganic substance can be suppressed. Therefore, the upper limit of the content of $M_2O_3$ is preferably 24%, more preferably 22%, and still more preferably 20%.

In particular, in M, the inclusion of both of Al and Y is more preferable in order to get higher ion conductivity, and it is still more preferable that 1% to 3% of $Al_2O_3$ is included and 0.5% to 5% of $Y_2O_3$ is included.

$SiO_2$ is a component that enhances the mechanical strength of the lithium ion conductive inorganic substance and improves the ion conductivity through partial exchange with $P_2O_5$. Therefore, greater than 0% of $SiO_2$ may be included. On the other hand, by adjusting $SiO_2$ to 18% or less, the formation of a glass phase is hindered and thus the formation of an intended crystalline phase can be promoted. Furthermore, crystals will readily adjoin each other and thus a decrease of the ion conductivity can be suppressed. Therefore, the upper limit of the content of $SiO_2$ is preferably 18%, more preferably 11%, and most preferably 4%.

It is preferred in the lithium ion conductive inorganic substance of the present invention that $Y_2O_3/(ZrO_2+Y_2O_3)$ is 0.001 or higher and 0.14 or less. It is also preferred in the lithium ion conductive inorganic substance of the present invention that $Sc_2O_3/(ZrO_2+Sc_2O_3)$ is 0.001 or higher and 0.10 or less. Specifically, by adjusting $Y_2O_3/(ZrO_2+Y_2O_3)$ or $Sc_2O_3/(ZrO_2+Sc_2O_3)$ to 0.001 or higher, the ion conductivity of the lithium ion conductive inorganic substance is enhanced and thus the charge-discharge properties of batteries can be further improved. Accordingly, the lower limit of the mass ratio of $Y_2O_3/(ZrO_2Y_2O_3)$ or $Sc_2O_3/(ZrO_2+Sc_2O_3)$ on an oxide basis is preferably 0.001, more preferably 0.005, and most preferably 0.010. On the other hand, by adjusting $Y_2O_3/(ZrO_2+Y_2O_3)$ to 0.14 or less or $Sc_2O_3/(ZrO_2+Sc_2O_3)$ to 0.10 or less, the use of expensive $Y_2O_3$ or $Sc_2O_3$ is reduced, thus the material cost of batteries can be lowered. Accordingly, the upper limit of the mass ratio on an oxide basis of $Y_2O_3/(ZrO_2+Y_2O_3)$ is preferably 0.14, more preferably 0.12, and most preferably 0.10. Besides, the upper limit of the mass ratio on an oxide basis of $Sc_2O_3/(ZrO_2+Sc_2O_3)$ is preferably 0.10, more preferably 0.08, and most preferably 0.05.

In addition, greater than 0% of at least one selected from LiF, SrO, and $V_2O_5$ may be used in the lithium ion conductive inorganic substance. Thereby, various additional properties such as an increase of the lithium ion conductivity, an increase of the mechanical strength, and imparting electron conductivity, may be imparted to the lithium ion conductive inorganic substance. On the other hand, from the viewpoint of assuring a high lithium ion conductivity, the upper limit of the content of these components is preferably 10%, more preferably 5%, and most preferably 3%.

On the other hand, it is preferred in the lithium ion conductive inorganic substance that the content of S components, MgO, CaO, and $K_2O$ is decreased as low as possible. Particularly, the generation of harmful gas such as hydrogen sulfide may be reduced from the batteries by decreasing the S components. Additionally, loss of flow paths of lithium ions due to a so-called mixed alkali effect may be suppressed by decreasing the MgO, CaO, and $K_2O$ components. On the other hand, the upper limit of the content of one or more of these components is preferably 5%, more preferably 3%, and most preferably 0%.

Specific examples of the lithium ion conductive inorganic substance include inorganic substances containing a crystalline phase of $Li_{1+x+z}M_xA_{2-x}P_{3-z}Si_zO_{12}$ (0<X≤1<1, 0<z<1, M: at least one selected from Al, Sc, Y, Ga, and La, A: at least one selected from Ti, Zr, Ge, and Sn), for example. Among others, Inorganic substances containing a crystalline phase of $Li_{1+x}+z(Al,Y)_xA_{2-x}P_{3-z}Si_zO_{12}$ (0.10<X<0.70, 0<Z<1, A: at least one selected from Ti, Ge, Zr, and Sn) are more preferable, and inorganic substances containing a crystalline phase of $Li_{1+x+z}(Al,Y)_x(Ti,Zr)_{2-x}P_{3-z}Si_zO_{12}$ (0.30<X<0.60, 0.25<Z<0.60) are most preferable. Thereby, the ion conductivity of the lithium ion conductive inorganic substance can be increased, thus batteries with enhanced charge-discharge properties may be easily obtained.

Preferably, the lithium ion conductive inorganic substance is a glass ceramic containing the crystalline phase described above. Thereby, adhesion of the crystal particles in the lithium ion conductive inorganic substance may be enhanced, thus the ion conductivity and chemical stability of the lithium ion conductive inorganic substance may be enhanced. On the other hand, the lithium ion conductive inorganic substance may be a ceramic containing the crystalline phase described above. Thereby, comminution of the lithium ion conductive inorganic substance may be facilitated, thus mixing with electrode active materials, etc. may be easily carried out when forming electrode layers, in particular. In addition, although it is preferred that an amorphous phase is formed in at least a part of the lithium ion conductive inorganic substance when preparing the all-solid secondary battery, the entire amount may become polycrystalline due to heating during the preparation of the all-solid secondary battery.

Preferably, the lithium ion conductive inorganic substance of this embodiment has a high lithium ion conductivity. More specifically, the lithium ion conductivity (ionic conductance) at 25° C. is preferably $1.0 \times 10^{-8}$ S·cm$^{-1}$ or higher. Thereby, the conduction of lithium ions through the lithium ion conductive inorganic substance may be smooth, thus the charge-discharge efficiency of the batteries may be further enhanced. Here, the lower limit of the ion conductivity of the lithium ion conductive inorganic substance is preferably $1.0 \times 10^{-8}$ S·cm$^{-1}$, more preferably $1.0 \times 10^{-7}$ and most preferably $1.0 \times 10^{-5}$ S·cm$^{-1}$. In addition, when the ion conductivity is less than $1 \times 10^{-10}$ S·cm$^{-1}$, the conduction of lithium ion does not occur substantially.

It is also preferred that the lithium ion conductive inorganic substance of this embodiment is resistant to undergoing reduction. More specifically, it is preferred that the potential at 25° C. with respect to Li is in the range of 0.3 V or higher and 1.5 V or less and the current density of the reduction current is less than 10 µA/cm². Thereby, the potential window may be expanded to a range of 1.5 V or less in terms of potential at 25° C. with respect to Li; consequently, decomposition of the lithium ion conductive inorganic substance due to reduction of the lithium ion conductive inorganic substance is hindered even when charging or discharging at higher voltages to the batteries, resulting in a lowering of electronic conduction through decomposition products. Therefore, the charge-discharge voltage of the batteries may be enhanced and also the charge-discharge properties of batteries may be enhanced. Here, the current density of the reduction current of the lithium ion conductive inorganic substance is preferably less than 10 µA/cm², more preferably less than 5 µA/cm², and most preferably less than 3 µA/cm².

In this embodiment, the thickness of the lithium ion conductive inorganic substance is preferably within a range of 0.5 µm or more and 1000 µm or less. Specifically, short circuits between the positive electrode layers and negative electrode layers in lithium ion secondary batteries can be reduced by adjusting the thickness of the lithium ion conductive inorganic substance of the solid electrolyte layers to 0.5 µm or more. Furthermore, penetration of water to the inside of the batteries through partition walls in lithium air batteries or lithium seawater batteries can be reduced by adjusting the thickness of the lithium ion conductive inorganic substance of the partition walls to 0.5 µm or more. Accordingly, the lower limit of the thickness of the lithium ion conductive inorganic substance is preferably 0.5 µm, more preferably 1.0 µm, and most preferably 2.0 µm. On the other hand, lithium ion conductivity through the lithium ion conductive inorganic substance can be assured by adjusting the thickness of the lithium ion conductive inorganic substance to 1000 µm or less. Accordingly, the upper limit of the thickness of the lithium ion conductive inorganic substance is preferably 1000 µm, more preferably 500 µm, and most preferably 300 µm.

When the lithium ion conductive inorganic substance is used as a powder, the average particle diameter (D50) of the powder is preferably 20 µm or less. Thereby, discharge of solvent or comminution of voids due to solvent may be facilitated. Accordingly, the average particle diameter (D50) is preferably 20 µm or less, more preferably 10 µm or less, and most preferably 5 µm or less. On the other hand, the lower limit of the average particle diameter (D50) is preferably 0.05 µm or higher, more preferably 0.1 µm or higher, and most preferably 0.2 µm or higher in view of shortening the time necessary for comminution. On the other hand, when the lithium ion conductive inorganic substance is formed from a glass ceramic, a plate-like-shaped lithium ion conductive inorganic substance may be used from the viewpoint of increasing the mechanical strength of batteries. Here, the "average particle diameter" in this specification refers to an average diameter on a volume basis measured using a particle size measuring apparatus of the laser diffraction/scattering type.

All-Solid Secondary Battery

The lithium ion conductive inorganic substance of the present invention may be favorably used for all-solid secondary batteries. The all-solid secondary battery has a positive electrode layer, a negative electrode layer, and a solid electrolyte layer intervening between them; and the lithium ion conductive inorganic substance is preferably included in at least one of the positive electrode layer, negative electrode layer, and solid electrolyte layer as a solid electrolyte. Thereby, products of the reduction of the solid electrolyte may be reduced, thus the charge-discharge properties of the all-solid secondary battery may be further improved. Among others, it is particularly preferable that the lithium ion conductive inorganic substance is included in all of the positive electrode layer, negative electrode layer, and solid electrolyte layer as a solid electrolyte. Thereby, the potential window of the all-solid secondary battery may be expanded, thus the charge-discharge voltage of the all-solid secondary battery may be further increased.

Solid Electrolyte Layer

Preferably, the solid electrolyte layer of this embodiment is formed from the lithium ion conductive inorganic substance. More specifically, the content of the lithium ion conductive inorganic substance is preferably 80% or more. Thereby, a route to conduct the lithium ion conductive inorganic substance may be easily formed in the solid electrolyte layer, thus the lithium ion conductivity in the solid electrolyte layer may be further enhanced. Therefore, the lower limit of the content of the lithium ion conductive inorganic substance in the solid electrolyte layer is preferably 80%, more preferably 90%, and most preferably 95%. On the other hand, the upper limit of the lithium ion conductive inorganic substance is not particularly limited and may be 100%.

Preferably, the solid electrolyte layer is formed by mixing the lithium ion conductive inorganic substance with a lithium conductive inorganic binder and sintering them. Thereby, the ion conductivity of the entire solid electrolyte layer may be increased. Here, the lithium conductive inorganic binder may be exemplified by amorphous or polycrystalline $LiPO_3$, $70LiPO_3$-$30Li_3PO_4$, $Li_2O$—$SiO_2$, and $Li_2O$—$SiO_2$—$P_2O_5$—$B_2O_5$—$BaO$. Among others, one or more selected from $Li_2O$—$P_2O_5$ glasses and $Li_2O$—$P_2O_5$-$M'_2O_3$ glasses (P may be substituted by Si; M' is Al or B) is preferable, and $LiPO_3$ made amorphous by quenching after melting is most preferable. Specifically, $LiPO_3$ made amorphous by quenching after melting has an ion conductivity of $8.8 \times 10^{-9}$, which is not high, but has a low Tg of about 280° C. and does not readily undergo crystallization; therefore, a solid electrolyte with high ion conductivity can be formed by mixing the binder and the lithium ion conductive inorganic substance of the present invention and heating them to 600° C. The upper limit of the content of the lithium conductive inorganic binder in the solid electrolyte layer is preferably 20% based on total mass of the solid electrolyte layer, more preferably 10%, and most preferably 5%.

Positive Electrode Layer and Negative Electrode Layer

Preferably, the positive electrode layer of this embodiment contains the lithium ion conductive inorganic substance described above, a positive electrode active material, and a conductive additive. Preferably, the negative electrode layer of this embodiment contains the lithium ion conductive inorganic substance described above, a negative electrode active material, and a conductive additive. Thereby, the lithium ion conductivity by virtue of the lithium ion conductive inorganic substance may be enhanced, and thus the exchange of lithium ions with the solid electrolyte layer may be facilitated even when the content of the lithium ion conductive inorganic substance is reduced; therefore, the electrode active substance may facilitate contact of both of the lithium ion conductive inorganic substance and the conductive additive. Here, in this specification, the positive electrode layer and the negative electrode layer are generically referred to as an electrode layer, and the positive electrode active material and the negative electrode active material are generically referred to as an electrode active material.

It is preferred in the electrode layer of this embodiment that the content of the lithium ion conductive inorganic substance is from 20% to 80% by mass. Specifically, by adjusting the content of the lithium ion conductive inorganic substance to 20% or more, a lithium ion-migration pathway formed of the lithium ion conductive inorganic substance may be easily assured, thus the charge-discharge properties and the battery capacity of the batteries may be enhanced more easily. Therefore, the lower, limit of the content of the lithium ion conductive inorganic substance in the electrode layer is preferably 20%, more preferably 40%, and most preferably 50%. On the other hand, by adjusting the content of the lithium ion conductive inorganic substance to 90% or less, an electron-migration pathway formed of the conductive additive may be easily assured, thus degradation of charge-discharge properties and battery capacity of batteries may be suppressed. Therefore, the upper limit of the content of the lithium ion conductive inorganic substance in the electrode layer is preferably 90%, more preferably 80%, and most preferably 70%.

Positive Electrode Active Material and Negative Electrode Active Material

Preferably, the positive electrode active material is a NASICON-type $LiV_2(PO_4)_3$, olivine-type $Li_xJ_yMtPO_4$ (in which, J: at least one selected from Al, Mg, and W; Mt: at least one selected from Ni, Co, Fe, and Mn; $0.9 \leq x \leq 1.5$, $0 \leq y \leq 0.2$), layer oxides, or spinel-type oxides, for example. Among these in particular, it is more preferably composed of $LiMtO_2$ and/or $LiMt_2O_4$ (in which, Mt: one or more selected from Fe, Ni, Co, and Mn). Thereby, the lithium ion conductive inorganic substance and the positive electrode active material readily make contact and thus lithium ions are readily transferred between the lithium ion conductive inorganic substance and the positive electrode active material; therefore, the charge-discharge behavior of the all-solid secondary battery may be further enhanced. $LiCoPO_4$, $LiCoO_2$, and $LiMn_2O_4$ may be used as the positive electrode active material, for example. Particularly, by forming it from $LiMtO_2$ and/or $LiMt_2O_4$, a joint surface is formed between a portion where lithium ions are two-dimensionally or three-dimensionally stored and a portion where lithium ions are conducted. By further adding Mg as a minor component, discharged capacity may be increased since thermal decomposition of the positive electrode active material may be suppressed.

On the other hand, preferably, the negative electrode active material is at least one selected from oxides containing NASICON-type, olivine-type, or spinel-type crystal; rutile-type oxides, anatase-type oxides, or amorphous metal oxides; and metal alloys, etc. Among these in particular, it is more preferably composed of $Li_{1+x+z}Al_yTi_2Si_zP_{3-z}O_{12}$ (in which, $0 \leq x \leq 0.8$, $0 \leq z \leq 0.6$, $Li_4Ti_5O_{12}$, or $TiO_2$. Thereby, the lithium ion conductive inorganic substance and the negative electrode active material readily make contact, thus lithium ions are readily transferred between the lithium ion conductive inorganic substance and the positive electrode active material; therefore, the charge-discharge behavior of the all-solid secondary battery may be further enhanced. Particularly, when formed from LiTiO and/or $TiO_x$, since the negative electrode potential may be lowered, the voltage of the battery may be raised. Specific examples of the negative electrode active material may be $Li_2V_2(PO_4)_3$, $Li_2Fe_2(PO_4)_3$, $LiFePO_4$, $Li_4Ti_5O_{12}$, $SiO_x$ (0.25×2), and $Cu_6Sn_5$.

Preferably, the content of the positive electrode active material and the negative electrode active material is 1% by mass or more and 20% by mass or less based on all the materials in the electrode layer (i.e., the positive electrode material or negative electrode material). Particularly, by adjusting the content to 1% by mass or more, the battery capacity of the secondary battery may be increased. Therefore, the lower limit of the content of the positive electrode active material and the negative electrode active material is preferably 1% by mass, more preferably 2% by mass, and most preferably 4% by mass. On the other hand, the electron conductivity of the electrode layer may be easily assured by adjusting the content to 20% by mass or less. Therefore, the upper limit of the content of the positive electrode active material and the negative electrode active material is preferably 20% by mass, more preferably 15% by mass, and most preferably 10% by mass.

It is preferred, in addition to the configuration described above, that the electrode layer is formed by mixing a lithium ion conductive inorganic binder and sintering. Thereby, the ion conductivity of the entire electrode layer may be enhanced. Here, the lithium conductive inorganic binder may be exemplified by amorphous or polycrystalline $LiPO_3$, $70LiPO_3$-$30Li_3PO_4$, $Li_2O$—$SiO_2$, and $Li_2O$—$SiO_2$—$P_2O_5$—$B_2O_5$—BaO. Among others, one or more selected from $Li_2O$—$P_2O_5$ glasses and $Li_2O$—$P_2O_5$-$M'_2O_3$ glasses (P may be substituted by Si; M' is Al or B) is preferable, and $LiPO_3$ made amorphous by quenching after melting is most preferable. Specifically, $LiPO_3$ made amorphous by quenching after melting has an ion conductivity of $8.8 \times 10^{-9}$, which is not high, but has a low Tg of about 280° C. and does not readily crystallize; therefore, a solid electrolyte with high ion conductivity can be formed by mixing the binder and the lithium ion conductive inorganic substance and heating them to 600° C. The upper limit of the content of the lithium conductive inorganic binder in the electrode layer is preferably 20% based on total mass of the electrode layer, more preferably 10%, and most preferably 5%.

Conductive Additive

Carbon, metals consisting of at least one of Ni, Fe, Mn, Co, Mo, Cr, Ag, and Cu, and alloys of these elements may be used as the conductive additive. Metals such as titanium, stainless, and aluminum, and noble metals such as platinum, silver, gold, and rhodium may also be used. By using a material with higher electron conductivity as the conductive additive, the amount of current capable of flowing through a narrow electron conductive path formed in the electrode layer is increased, thus the charge-discharge behavior of the all-solid secondary battery may be enhanced.

The content of the conductive additive is preferably 1% by mass or higher and 20% by mass or less, more preferably 2% by mass or higher and 15% by mass or less, and most preferably 4% by mass or higher and 10% by mass or less based on the total of the electrode materials (i.e., positive electrode active materials and negative electrode active materials) in the electrode layer from the viewpoint of the balance between the battery capacity and the electron conductivity of the electrode layer.

Here, in the all-solid secondary battery using the lithium ion conductive inorganic substance of the present invention, one or two of the solid electrolyte layer, the positive electrode layer, and the negative electrode layer may be a conventional one, and the conventional one may be combined with the constitution of the solid electrolyte layer, the positive electrode layer, and/or the negative electrode layer of this embodiment. However, when the solid electrolyte layer, the positive electrode layer, and the negative electrode layer are all according to this embodiment, the potential window may be further expanded, electrolysis of the lithium ion conductive inorganic substance may be reduced, and thus an all-solid secondary battery with a higher charge-discharge voltage may be formed.

Further, the content and composition of the lithium ion conductive inorganic substance, the electrode active material, and the conductive additive, in which the lithium ion conductive inorganic substance of the present invention is used, can be identified by cutting off the solid electrolyte layer and/or electrode layer and using an energy loss analyzer or X-ray analyzer mounted on a field-emission transmission electron microscopy (FE-TEM) or an X-ray analyzer mounted on a field-emission scanning electron microscopy (FE-SEM). The presence or absence, content, and composition of the intended lithium ion conductive inorganic substance in the solid electrolyte layer, for example, may be revealed by use of the quantitative analysis or point analysis. Here, when the X-ray analyzer is used, an $Li_2O$ component cannot be directly analyzed, but the content of an $Li_2O$ component can be estimated by calculating an electric charge from the other constitutional components.

Current Collector

The all-solid secondary battery of this embodiment may be provided with a current collector in the positive electrode layer and/or the negative electrode layer. Thereby, electricity may be easily taken through the current collector, thus charging to the all-solid secondary battery, and discharging from the all-solid secondary battery may be facilitated. In regards to the specific embodiment of laminating the current collector, a thin-film metal layer may be laminated or contacted to the positive electrode layer and/or the negative electrode layer; alternatively a precursor of the metal layer or a precursor of the electric conductor may be laminated to the raw material composition and then sintered. In addition, the formation of the current collector may be omitted when the electrode layer itself has a high electron conductivity.

Lithium Air Battery and Lithium Seawater Battery

The lithium ion conductive inorganic substance of the present invention may be favorably used for lithium air batteries or lithium seawater batteries. Here, the lithium air batteries and lithium seawater batteries have a configuration wherein an electromotive body, which fills an electrolyte between an air electrode to which a current collector is attached, and a negative electrode composite body to which a current collector is attached, is housed in a container and sealed with an oxygen permeation body. Here, the negative electrode composite body is configured such that a negative electrode is coated with a partition wall consisting of the lithium ion conductive inorganic substance. Thereby, the negative electrode may be protected from water in an electrolyte, etc. and lithium ions may be conduct within the lithium ion conductive inorganic substance, resulting in progress of battery reaction. In addition, a buffer layer may be provided between the negative electrode and the partition wall in order to reduce the reduction of the partition wall due to the negative electrode.

Among these, the material of the negative electrode may be lithium metal, or alloys or compounds having lithium as the main component, for example. Here, metal forming alloys with lithium may be exemplified by magnesium, calcium, aluminum, silicon, germanium, tin, lead, arsenic, antimony, bismuth, silver, gold, zinc, cadmium, mercury, etc. The compounds are exemplified by $Li_{3-x}M_xN$ (M=Co, Cu, Fe, etc.).

Additionally, the electrolyte may use conventional pH buffer solutions containing lithium ion or may be composed from the solid electrolyte layer described above.

Additionally, conventional electrodes used for lithium air batteries or lithium seawater batteries may be employed as the positive electrode. For example, a shaped body, where particles of catalyst material such as platinum are supported on a powder or fibers of carbon, may be used as the positive electrode (air electrode) for lithium air batteries.

EXAMPLES

Hereinafter, the present invention is explained by providing specific examples.

Examples 1 to 14

Figure 2:
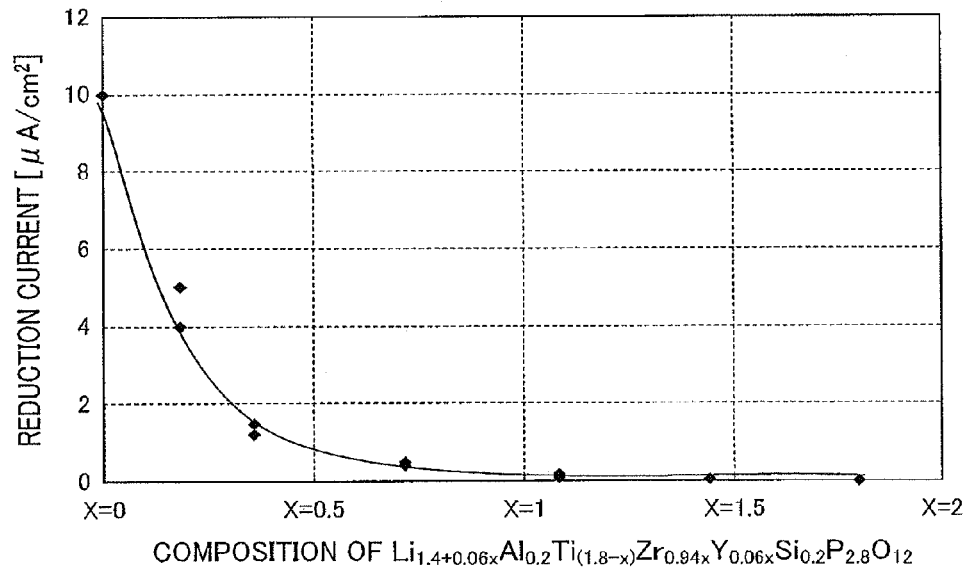
FIG. 2 is a graph that shows a composition dependence of current density of reduction current in a case where Ti included in a lithium ion conductive inorganic substance is substituted with 6 mol % of Y and 94 mol % of Zr.

A lithium ion conductive inorganic substance expressed by the general formula $Li_{1.4+0.06x}Al_{0.2}Ti_{(1.8-x)}Zr_{0.94x}Y_{0.06x}Si_{0.2}P_{2.8}O_{12}$ was evaluated for ion conductivity and reduction resistance with respect to the lithium ion conductive inorganic substance of which Ti was substituted with 6 mol % of Y and 94 mol % of Zr. Here, Table 1 shows a substituted amount x which indicates the amount of Ti substituted by 6 mol % of 1 and 94 mol % of Zr, and the values of the composition on an oxide basis, ion conductivity, and current density of the reduction current of the lithium ion conductive inorganic substance. Furthermore, FIG. 1 shows a relation between the substituted amount x and the ion conductivity, and FIG. 2 shows a relation between the substituted amount x and the reduction current. Here, Examples 1 and 2 are reference examples in which the substituted amount x is 0.

The lithium ion conductive inorganic substance was prepared using $Li_2CO_3$, $TiO_2$, $H_3PO_4$, $Al(PO_3)_3$, $ZrO_2$, $Y_2O_3$, and $SiO_2$ as raw materials, and the raw materials were mixed in a stoichiometric proportion shown in Table 1, followed by primary sintering at 1480° C. for 5 hours. The resulting primary sintered material was milled into an average particle diameter (D50) of 1 μm or less by a planetary ball mill using YTZ balls of diameter 10 mm. Milled samples of 1 g were pressed into tablets of diameter 20 mm by a tableting device, then which were sandwiched in a mold of SUS304 and cold-pressed under a pressure of 196 MPa, followed by secondary sintering at 1300° C. for 1 hour. After the secondary sintering, both sides of the tablets were polished by #900 waterproof polishing paper to remove a surface of about 10 μm thickness followed by rinsing with ethanol, then electrodes were attached by sputtering gold within a range of 13 mmϕ on both sides. The measurement of the ion conductivity of the resulting tablets was performed by measuring an impedance while applying an AC voltage to the tablets using an impedance analyzer (by Solartron Co., model SI1260). The impedance was measured within a range from 1000 kHz to 0.1 Hz.

On the other hand, the samples to be evaluated were prepared similarly until the polishing step using the waterproof polishing paper described above, then one side was subjected to gold sputtering and another side was subjected to press-attaching of a polymer electrolyte and Li metal, followed by vacuum packaging. The samples were evaluated for a maximum value of current density of the reduction current while sweeping a potential from the Li metal from 3 V to 1 V by 2 mV/sec. Here, all of the measurements of the ion conductivity and current density of the reduction current were performed at 25° C.

TABLE 1

|  | x | Composition on an oxide basis [mass %] | | | | | | | Ion conductivity [S/cm] | Reduction current (1.0 V vs Li) [μA/cm²] |
|---|---|---|---|---|---|---|---|---|---|---|
|  |  | $Li_2O$ | $Al_2O_3$ | $TiO_2$ | $ZrO_2$ | $Y_2O_3$ | $SiO_2$ | $P_2O_5$ | Total |  |  |
| Example 1 | 0 | 5.4 | 2.6 | 37.3 | 0.0 | 0.0 | 3.1 | 51.5 | 100.0 | $3.2 \times 10^{-4}$ | 10 |
| Example 2 | 0 | 5.4 | 2.6 | 37.3 | 0.0 | 0.0 | 3.1 | 51.5 | 100.0 | $4.0 \times 10^{-4}$ | 10 |
| Example 3 | 0.18 | 5.4 | 2.6 | 32.9 | 5.3 | 0.3 | 3.1 | 50.5 | 100.0 | $3.0 \times 10^{-4}$ | 5 |
| Example 4 | 0.18 | 5.4 | 2.6 | 32.9 | 5.3 | 0.3 | 3.1 | 50.5 | 100.0 | $3.0 \times 10^{-4}$ | 4 |
| Example 5 | 0.36 | 5.3 | 2.5 | 28.7 | 10.4 | 0.6 | 3.0 | 49.5 | 100.0 | $2.3 \times 10^{-4}$ | 1.2 |
| Example 6 | 0.36 | 5.3 | 2.5 | 28.7 | 10.4 | 0.6 | 3.0 | 49.5 | 100.0 | $2.2 \times 10^{-4}$ | 1.5 |
| Example 7 | 0.72 | 5.2 | 2.4 | 20.7 | 20.0 | 1.2 | 2.9 | 47.7 | 100.0 | $1.1 \times 10^{-5}$ | 0.4 |
| Example 8 | 0.72 | 5.2 | 2.4 | 20.7 | 20.0 | 1.2 | 2.9 | 47.7 | 100.0 | $1.2 \times 10^{-5}$ | 0.5 |
| Example 9 | 1.08 | 5.1 | 2.4 | 13.3 | 28.9 | 1.7 | 2.8 | 45.9 | 100.0 | $4.0 \times 10^{-6}$ | 0.1 |
| Example 10 | 1.08 | 5.1 | 2.4 | 13.3 | 28.9 | 1.7 | 2.8 | 45.9 | 100.0 | $4.2 \times 10^{-6}$ | 0.2 |
| Example 11 | 1.44 | 5.0 | 2.3 | 6.4 | 37.2 | 2.2 | 2.7 | 44.3 | 100.0 | $2.0 \times 10^{-6}$ | 0.05 |
| Example 12 | 1.44 | 5.0 | 2.3 | 6.4 | 37.2 | 2.2 | 2.7 | 44.3 | 100.0 | $2.5 \times 10^{-6}$ | 0.04 |
| Example 13 | 1.80 | 4.9 | 2.2 | 0.0 | 44.9 | 2.6 | 2.6 | 42.8 | 100.0 | $1.0 \times 10^{-6}$ | 0.01 |
| Example 14 | 1.80 | 4.9 | 2.2 | 0.0 | 44.9 | 2.6 | 2.6 | 42.8 | 100.0 | $1.2 \times 10^{-6}$ | 0.01 |

It is demonstrated by Table 1 and FIG. 1 that in the lithium ion conductive inorganic substance expressed by $Li_{1.4+0.06x}Al_{0.2}Ti_{(1.8-x)}Zr_{0.94x}Y_{0.06x}Si_{0.2}P_{2.8}O_{12}$, the ion conductivity is almost unchanged when x is 0.4 or less, and the ion conductivity considerably decreases when x is greater than 0.4. However, even when Ti was completely substituted with 6 mol % of Y and 94 mol % of Zr (x=1.8), the ion conductivity was maintained at $1 \times 10^{-6}$ S/cm. It is surmised from these results that higher ion conductivity can be obtained even when Ti is substituted with Zr in the lithium ion conductive inorganic substance since it has a skeleton similar to that of $Li_{1.4}Al_{0.2}Ti_{1.8}Si_{0.2}P_{2.8}O_{12}$.

It is also demonstrated by Table 2 and FIG. 2 in the lithium ion conductive inorganic substance expressed by $Li_{1.4+0.06x}Al_{0.2}Ti_{(1.8-x)}Zr_{0.94x}Y_{0.06x}Si_{0.2}P_{2.8}O_{12}$ that the current density of the reduction current is less than 10 μA/cm² when x is greater than 0. It is also demonstrated that, when x is increased to 0.2 or higher, it decreases to half or less of the level when x is 0. It is also demonstrated that, when x is increased to 0.4 or higher, it decreases to about one tenth of the level when x is 0. It is surmised from these results that, in the lithium ion conductive inorganic substance of the present invention, the reduction current due to the reduction of Ti can be considerably suppressed while reducing the decrease of ion conductivity.

Examples 15 to 21

Figure 3:
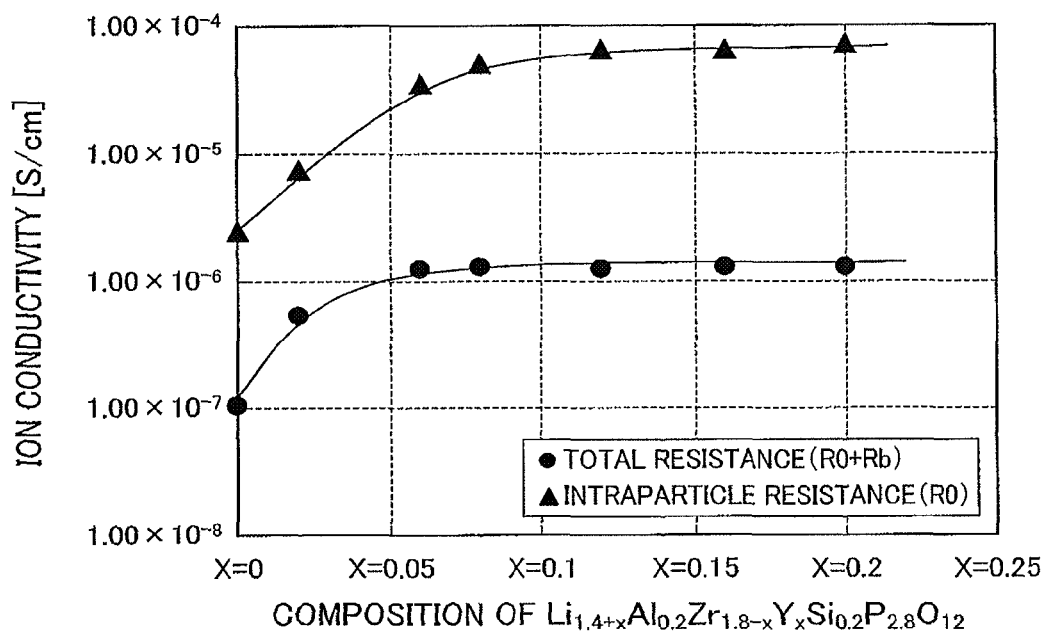
FIG. 3 is a graph that shows a relation between x and a resistance value of a lithium ion conductive inorganic substance of $Li_{1.4+x}Al_{0.2}Zr_{1.8-x}Y_xSi_{0.2}P_{2.8}O_{12}$.

A lithium ion conductive inorganic substance expressed by the general formula $Li_{1.4+x}Al_{0.2}Zr_{1.8-x}Y_xSi_{0.2}P_{2.8}O_{12}$ was evaluated for a resistance value of lithium ion conductive inorganic substance when the contents of Zr and Y in the lithium ion conductive inorganic substance were changed; that is, the intraparticle resistance ($R_o$) and total resistance of the lithium ion conductive inorganic substance ($R_o+R_b$) were evaluated, and the ion conductivity was calculated from the resistance values. Here, Table 2 shows a substituted amount x which indicates the amount of Zr substituted with Y, the composition on an oxide basis of the lithium ion conductive inorganic substance, and resistance value of the lithium ion conductive inorganic substance. Furthermore, FIG. 3 shows a relation between the substituted amount x and the resistance value.

The lithium ion conductive inorganic substance was prepared using $Li_2CO_3$, $TiO_2$, $H_3PO_4$, $Al(PO_3)_3$, $ZrO_2$, $Y_2O_3$, and $SiO_2$ as raw materials, and the raw materials were mixed in the stoichiometric proportion shown in Table 2, followed by primary sintering at 1480° C. for 5 hours. The resulting primary sintered material was milled into an average particle diameter (D50) of 1 μm or less by a planetary ball mill using YTZ balls of diameter 10 mm. Milled sample of 1 g were pressed into tablets of diameter 20 mm by a tableting device, then which were sandwiched in a mold of SUS304 and cold-pressed under a pressure of 196 MPa, followed by secondary sintering at 1300° C. for 1 hour. After the secondary sintering, both sides of the tablets were polished by #900 waterproof polishing paper to remove a surface of about 10 μm thickness followed by rinsing with ethanol, then electrodes were attached by sputtering gold within a range of 13 mmφ on both sides. The measurement of resistance and ion conductivity of the resulting tablet was performed by measuring an impedance while applying an AC voltage to the tablet similarly to Examples 1 to 14. The impedance was measured within a range from 1000 kHz to 0.1 Hz.

TABLE 2

|  | x | Composition on an oxide basis [mass %] | | | | | | | Ion conductivity ($R_0$) [S/cm] | Ion conductivity ($R_0+R_b$) [S/cm] |
|---|---|---|---|---|---|---|---|---|---|---|
|  |  | $Li_2O$ | $Al_2O_3$ | $ZrO_2$ | $Y_2O_3$ | $SiO_2$ | $P_2O_5$ | Total |  |  |
| Example 15 | 0 | 4.5 | 2.2 | 47.8 | 0.0 | 2.6 | 42.9 | 100.0 | $1.03 \times 10^{-7}$ | $2.50 \times 10^{-6}$ |
| Example 16 | 0.02 | 4.6 | 2.2 | 47.3 | 0.5 | 2.6 | 42.9 | 100.0 | $5.23 \times 10^{-7}$ | $7.60 \times 10^{-6}$ |
| Example 17 | 0.06 | 4.7 | 2.2 | 46.2 | 1.5 | 2.6 | 42.8 | 100.0 | $1.25 \times 10^{-6}$ | $3.53 \times 10^{-5}$ |
| Example 18 | 0.08 | 4.8 | 2.2 | 45.7 | 1.9 | 2.6 | 42.8 | 100.0 | $1.26 \times 10^{-6}$ | $5.02 \times 10^{-5}$ |
| Example 19 | 0.12 | 4.9 | 2.2 | 44.6 | 2.9 | 2.6 | 42.8 | 100.0 | $1.25 \times 10^{-6}$ | $6.61 \times 10^{-5}$ |
| Example 20 | 0.16 | 5.0 | 2.2 | 43.5 | 3.9 | 2.6 | 42.8 | 100.0 | $1.29 \times 10^{-6}$ | $6.55 \times 10^{-5}$ |
| Example 21 | 0.20 | 5.1 | 2.2 | 42.4 | 4.9 | 2.6 | 42.8 | 100.0 | $1.29 \times 10^{-6}$ | $7.21 \times 10^{-5}$ |

It is demonstrated by Table 2 and FIG. 3 that the total resistance ($R_o+R_b$) is higher and the ion conductivity of the lithium ion conductive inorganic substance is also higher since the intraparticle resistance ($R_o$) is larger even when x is 0. It is also demonstrated that the total resistance ($R_o+R_b$) is higher and also the ion conductivity of the lithium ion conductive inorganic substance is further increased as x is larger when x is within a range greater than 0 and 0.08 or less. On the other hand, when x is greater than 0.08, it is demonstrated that the ion conductivity tends to be saturated in relation to the content of Y since the total resistance ($R_o+R_b$) keeps an almost constant value. Here, since Y is a more expensive component than Zr, from the viewpoint of reducing the material cost of the all-solid secondary battery while enhancing the reduction resistance and ion conductivity, it is demonstrated that x is preferably 0.02 or higher and 0.20 or less, more preferably 0.06 or higher and 0.12 or less, and most preferably approximately 0.08.

Examples 22 to 23

Figure 4:
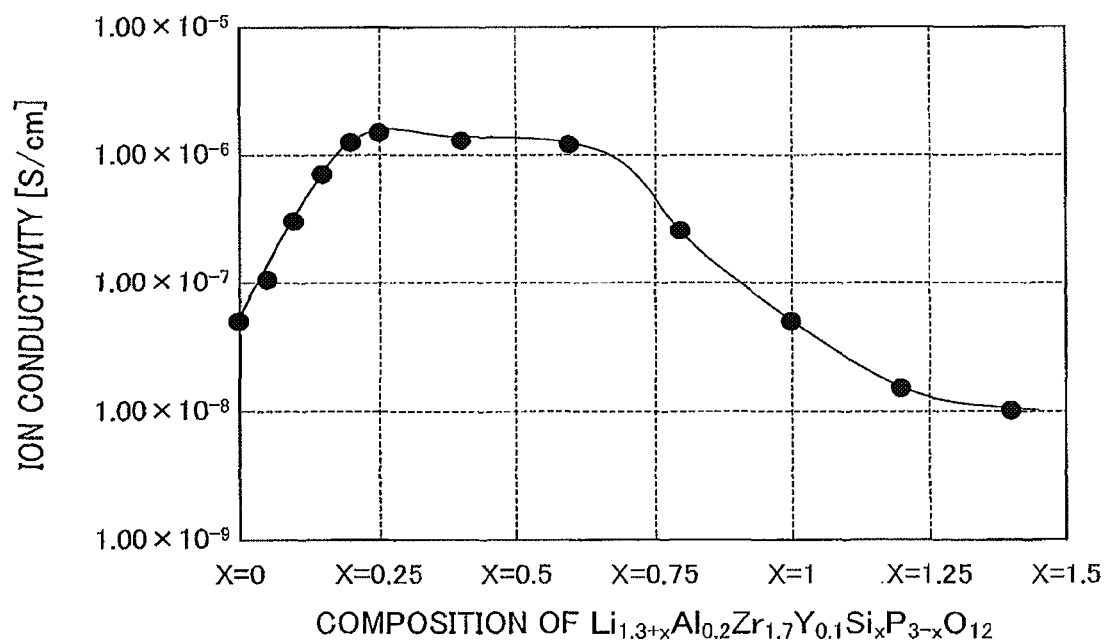
FIG. 4 is a graph that shows a relation between the Si content x and the ion conductivity of a lithium ion conductive inorganic substance of $Li_{1.3+x}Al_{0.2}Zr_{1.7}Y_{0.1}Si_xP_{3-x}O_{12}$.

A lithium ion conductive inorganic substance expressed by the general formula $Li_{1.3+x}Al_{0.2}Zr_{1.7}Y_{0.1}Si_xP_{3-x}O_{12}$ was evaluated for ion conductivity by changing the contents of Si and P of the lithium ion conductive inorganic substance. Here, Table 3 shows a substituted amount x which indicates the amount of P substituted with Si, the composition on an oxide basis of the lithium ion conductive inorganic substance, and the ion conductivity. Furthermore, FIG. 4 shows a relation between the substituted amount x and the ion conductivity.

The lithium ion conductive inorganic substance was prepared using $Li_2CO_3$, $TiO_2$, $H_3PO_4$, $Al(PO_3)_3$, $ZrO_2$, $Y_2O_3$, and $SiO_2$ as raw materials, and the raw materials were mixed in a stoichiometric proportion shown in Table 3, followed by primary sintering at 1480° C. for 5 hours. The resulting primary sintered material was milled into an average particle diameter (D50) of 1 μm or less by a planetary ball mill using YTZ balls of diameter 10 mm. Milled samples of 1 g were pressed into tablets of diameter 20 mm by a tableting device, then which were sandwiched in a mold of SUS304 and cold-pressed under a pressure of 196 MPa, followed by secondary sintering at 1300° C. for 1 hour. After the secondary sintering, both sides of the tablets were polished by #900 waterproof polishing paper to remove a surface of about 10 μm thick followed by rinsing with ethanol, then electrodes were attached by sputtering gold within a range of 13 mmφ on both sides. The measurement of the ion conductivity of the resulting tablets was performed by measuring an impedance while applying an AC voltage to the tablet similarly to Examples 1 to 14. The impedance was measured within a range from 1000 kHz to 0.1 Hz.

TABLE 3

| | x | Composition on an oxide basis [mass %] | | | | | | | Ion conductivity [S/cm] |
| | | $Li_2O$ | $Al_2O_3$ | $ZrO_2$ | $Y_2O_3$ | $SiO_2$ | $P_2O_5$ | Total | |
|---|---|---|---|---|---|---|---|---|---|
| Example 22 | 0 | 4.2 | 2.2 | 45.2 | 2.4 | 0.0 | 46.0 | 100.0 | $5.00 \times 10^{-8}$ |
| Example 23 | 0.05 | 4.4 | 2.2 | 45.2 | 2.4 | 0.6 | 45.2 | 100.0 | $1.05 \times 10^{-7}$ |
| Example 24 | 0.10 | 4.5 | 2.2 | 45.2 | 2.4 | 1.3 | 44.4 | 100.0 | $3.00 \times 10^{-7}$ |
| Example 25 | 0.15 | 4.7 | 2.2 | 45.2 | 2.4 | 1.9 | 43.6 | 100.0 | $7.02 \times 10^{-7}$ |
| Example 26 | 0.20 | 4.8 | 2.2 | 45.1 | 2.4 | 2.6 | 42.8 | 100.0 | $1.25 \times 10^{-6}$ |
| Example 27 | 0.25 | 5.0 | 2.2 | 45.1 | 2.4 | 3.2 | 42.0 | 100.0 | $1.50 \times 10^{-6}$ |
| Example 28 | 0.40 | 5.5 | 2.2 | 45.1 | 2.4 | 5.2 | 39.7 | 100.0 | $1.29 \times 10^{-6}$ |
| Example 29 | 0.60 | 6.1 | 2.2 | 45.0 | 2.4 | 7.7 | 36.6 | 100.0 | $1.20 \times 10^{-6}$ |
| Example 30 | 0.80 | 6.7 | 2.2 | 44.9 | 2.4 | 10.3 | 33.5 | 100.0 | $2.50 \times 10^{-7}$ |
| Example 31 | 1.0 | 7.4 | 2.2 | 44.8 | 2.4 | 12.9 | 30.4 | 100.0 | $5.00 \times 10^{-8}$ |
| Example 32 | 1.2 | 8.0 | 2.2 | 44.7 | 2.4 | 15.4 | 27.3 | 100.0 | $1.50 \times 10^{-8}$ |
| Example 33 | 1.4 | 8.6 | 2.2 | 44.7 | 2.4 | 17.9 | 24.2 | 100.0 | $1.00 \times 10^{-8}$ |

It is demonstrated by Table 3 and FIG. 4 that the ion conductivity is as small as $5.0 \times 10^{-8}$ S/cm when x, i.e. the content of Si, is 0. However, when x is within a range greater than 0 and 0.25 or less, the ion conductivity becomes larger as x is increased. In addition, when x is within a range greater than 0.25 and 0.60 or less, an increase of x leads to a small change of the ion conductivity. On the other hand, when x is greater than 0.60, the ion conductivity becomes smaller as x is increased, and the ion conductivity when x is 1.0 is approximately identical to the ion conductivity when x is 0. It is demonstrated from these results that the value of x in the lithium ion conductive inorganic substance is preferably greater than 0 and less than 1.0, more preferably greater than 0.10 and 0.80 or less, and most preferably greater than 0.25 and 0.60 or less.

Examples 34 to 46

Figure 5:
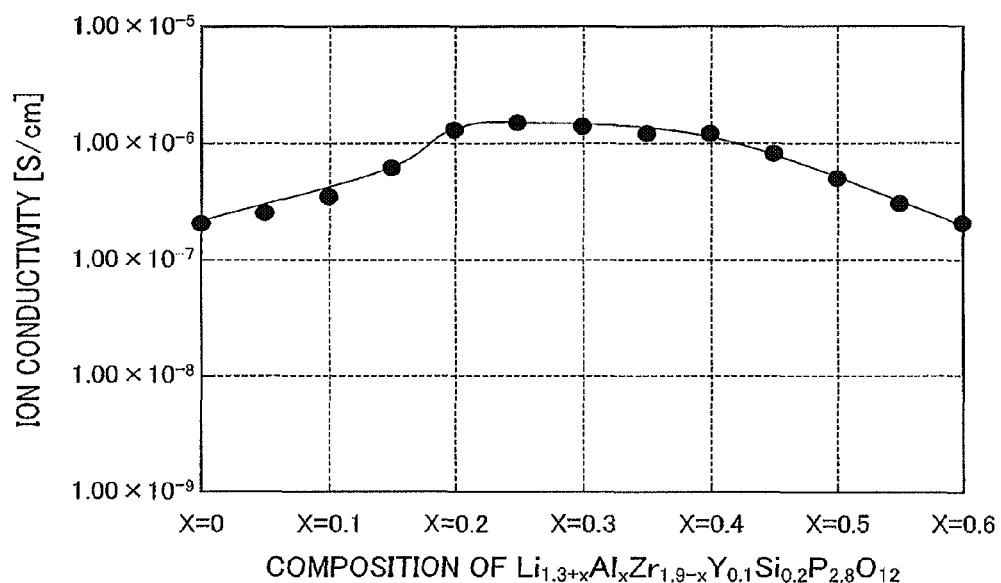
FIG. 5 is a graph that shows a relation between the Al content x and the ion conductivity of a lithium ion conductive inorganic substance of $Li_{1.3+x}Al_xZr_{1.9-x}Y_{0.1}Si_{0.2}P_{2.8}O_{12}$.

A lithium ion conductive inorganic substance expressed by the general formula $Li_{1.3+x}Al_xZr_{1.9-y}Y_{0.1}Si_{0.2}P_{2.8}O_{12}$ was evaluated for ion conductivity when the content of Al in the lithium ion conductive inorganic substance was changed. Here, Table 4 shows the content x of Al, the composition on an oxide basis of the lithium ion conductive inorganic substance, and the value of the ion conductivity. Furthermore, FIG. 5 shows a relation between the content x of Al and the ion conductivity. Here, the preparation of the lithium ion conductive inorganic substance and evaluation of the ion conductivity were performed by procedures similar to those of Examples 22 to 33.

TABLE 4

| | x | $Li_2O$ | $Al_2O_3$ | $ZrO_2$ | $Y_2O_3$ | $SiO_2$ | $P_2O_5$ | 合計 | Ion conductivity [S/cm] |
|---|---|---|---|---|---|---|---|---|---|
| | | | | Composition on an oxide basis [mass %] | | | | | |
| Example 34 | 0 | 4.1 | 0.0 | 49.2 | 2.4 | 2.5 | 41.8 | 100.0 | $2.0 \times 10^{-7}$ |
| Example 35 | 0.05 | 4.3 | 0.5 | 48.2 | 2.4 | 2.5 | 42.0 | 100.0 | $2.5 \times 10^{-7}$ |
| Example 36 | 0.10 | 4.5 | 1.1 | 47.2 | 2.4 | 2.6 | 42.3 | 100.0 | $3.4 \times 10^{-7}$ |
| Example 37 | 0.15 | 4.6 | 1.6 | 46.2 | 2.4 | 2.6 | 42.6 | 100.0 | $6.0 \times 10^{-7}$ |
| Example 38 | 0.20 | 4.8 | 2.2 | 45.1 | 2.4 | 2.6 | 42.8 | 100.0 | $1.3 \times 10^{-6}$ |
| Example 39 | 0.25 | 5.0 | 2.8 | 44.1 | 2.4 | 2.6 | 43.1 | 100.0 | $1.5 \times 10^{-6}$ |
| Example 40 | 0.30 | 5.2 | 3.3 | 43.0 | 2.5 | 2.6 | 43.4 | 100.0 | $1.4 \times 10^{-6}$ |
| Example 41 | 0.35 | 5.4 | 3.9 | 41.9 | 2.5 | 2.6 | 43.6 | 100.0 | $1.2 \times 10^{-6}$ |
| Example 42 | 0.40 | 5.6 | 4.5 | 40.8 | 2.5 | 2.7 | 43.9 | 100.0 | $1.2 \times 10^{-6}$ |
| Example 43 | 0.45 | 5.8 | 5.1 | 39.7 | 2.5 | 2.7 | 44.2 | 100.0 | $8.0 \times 10^{-7}$ |
| Example 44 | 0.50 | 6.0 | 5.7 | 38.6 | 2.5 | 2.7 | 44.5 | 100.0 | $5.0 \times 10^{-7}$ |
| Example 45 | 0.55 | 6.2 | 6.3 | 37.5 | 2.5 | 2.7 | 44.8 | 100.0 | $3.0 \times 10^{-7}$ |
| Example 46 | 0.60 | 6.4 | 6.9 | 36.3 | 2.6 | 2.7 | 45.0 | 100.0 | $2.0 \times 10^{-7}$ |

It is demonstrated by Table 4 and FIG. 5 that the ion conductivity is as small as $2.0 \times 10^{-7}$ S/cm when x, i.e. the content of Al, is 0. However, when x is within a range greater than 0 and 0.20 or less, the ion conductivity becomes larger as x is increased. In addition, when x is within a range greater than 0.20 and 0.50 or less, an increase of x leads to a small change of the ion conductivity. On the other hand, when x is greater than 0.50, the ion conductivity becomes smaller as x is increased, and the ion conductivity when x is 0.6 is approximately identical to the ion conductivity when x is 0. It is demonstrated from these results that the value of x in the lithium ion conductive inorganic substance is preferably greater than 0 and less than 0.60, more preferably greater than 0.10 and 0.55 or less, and most preferably greater than 0.20 and 0.50 or less.

Examples 47 to 50

Preparation of Powder for Positive Electrode Layer

In these Examples, a powder for a positive electrode layer was prepared by mixing a lithium ion conductive inorganic substance, a positive electrode active substance, a conductive additive, and an inorganic binder. These materials were blended in accordance with Table 5, to which then 10 grams of water, 0.3 gram of a dispersing agent (by BYK Japan KK., BYK, BYK190), and zirconia balls of diameter 5 mm were added, then these were mixed by a planetary centrifugal vacuum mixer (by Thinky Co., ARV-200) at 1000 rpm for 10 minutes and dried, followed by being milled by a Labo Milser (by Iwatani Co., LM-PLUS) at 20000 rpm for 30 minutes into a powder. Here, $LiMn_2O_4$ (by Honjo Chemical Co.) was used as the positive electrode active material.

TABLE 5

| | Positive electrode active material | Lithium ion conductive inorganic substance | Inorganic binder | Conductive additive |
|---|---|---|---|---|
| Example 47 | $LiMn_2O_4$ 1.25 g | $Li_{1.55}Al_{0.2}Zr_{1.7}Y_{0.1}Si_{0.25}P_{2.75}O_{12}$ 3 g | $LiPO_3$ glass 0.25 g | Acetylene black 0.5 g |
| Example 48 | $LiMn_2O_4$ 1.25 g | $Li_{1.44}Al_{0.2}Ti_{1.08}Zr_{0.68}Y_{0.04}Si_{0.2}P_{2.8}O_{12}$ 3 g | $LiPO_3$ glass 0.25 g | Acetylene black 0.5 g |
| Example 49 (Comparative Example) | $LiMn_2O_4$ 1.25 g | $Li_{1.3}Al_{0.3}Ti_{1.7}(PO_4)_3$ (LATP) 3 g | $LiPO_3$ glass 0.25 g | Acetylene black 0.5 g |
| Example 50 (Comparative Example) | $LiMn_2O_4$ 1.25 g | $LiZr_2(PO_4)_3$ (LZP) 3 g | $LiPO_3$ glass 0.25 g | Acetylene black 0.5 g |

Preparation of Powder for Negative Electrode Layer

In these Examples, a powder for a negative electrode layer was prepared by mixing a lithium ion conductive inorganic substance, a negative electrode active substance, and a conductive additive.

These materials were blended in accordance with Table 6, to which then 10 grams of water, 0.3 gram of a dispersing agent (By BYK Japan KK., BYK, BYK190) and zirconia balls of diameter 5 mm were added, then these were mixed by a planetary centrifugal vacuum mixer (by Thinky Co., ARV-200) at 1000 rpm for 10 minutes and dried, followed by being milled by a Labo Milser (by Iwatani Co., LM-PLUS) at 20000 rpm for 30 minutes into a powder. Here, $TiO_2$ (by Sakai Chemical Industry, Co., anatase) was used as the negative electrode active material.

TABLE 6

| | Negative electrode active substance | Lithium ion conductive inorganic substance | Inorganic binder | Conductive additive |
|---|---|---|---|---|
| Example 47 | $TiO_2$ 1.25 g | $Li_{1.55}Al_{0.2}Zr_{1.7}Y_{0.1}Si_{0.25}P_{2.75}O_{12}$ 3 g | $LiPO_3$ glass 0.25 g | Acetylene black 0.5 g |
| Example 48 | $TiO_2$ 1.25 g | $Li_{1.44}Al_{0.2}Ti_{1.08}Zr_{0.68}Y_{0.04}Si_{0.2}P_{2.8}O_{12}$ 3 g | $LiPO_3$ glass 0.25 g | Acetylene black 0.5 g |
| Example 49 (Comparative Example) | $TiO_2$ 1.25 g | $Li_{1.3}Al_{0.3}Ti_{1.7}(PO_4)_3$ (LATP) 3 g | $LiPO_3$ glass 0.25 g | Acetylene black 0.5 g |
| Example 50 (Comparative Example) | $TiO_2$ 1.25 g | $LiZr_2(PO_4)_3$ (LZP) 3 g | $LiPO_3$ glass 0.25 g | Acetylene black 0.5 g |

Preparation of Powder for Solid Electrolyte Layer

As for the lithium ion conductive inorganic substance, $Li_{1.55}Al_{0.2}Zr_{1.7}Y_{0.1}Si_{0.25}P_{2.75}O_{12}$ was used in Example 47, $Li_{1.44}Al_{0.2}Ti_{1.08}Zr_{0.68}Y_{0.04}Si_{0.2}P_{2.8}O_{12}$ was used in Example 48, $Li_{1.3}Al_{0.3}Ti_{1.7}(PO_4)_3$ was used in Example 49, and $LiZr_2(PO_4)_3$ was used in Example 50.

2.85 g of each of these lithium ion conductive inorganic substances and 0.15 g of $LiPO_3$ glass as an inorganic binder were weighed, to which then 10 grams of water and zirconia balls of diameter 5 mm were added, then these were mixed by a planetary centrifugal vacuum mixer (by Thinky Co., ARV-200) at 1000 rpm for 10 minutes and dried, followed by being milled by a Labo Milser (by Iwatani Co., LM-PLUS) at 20000 rpm for 30 minutes into a powder.

Preparation of All-Solid Secondary Battery

All-solid secondary batteries were prepared using the resulting powders for the positive electrode layer, powders for the negative electrode layer, and powders for the solid electrode layer.

25 mg of a powder for the negative electrode layer was inserted into a die of diameter 11 mm of a tableting device, then the surface of the powder was lightly compacted and flattened by a rod of diameter 11 mm. 50 mg of a powder for the solid electrode layer was inserted thereon, the powder for solid electrode layer was leveled such that the pre-inserted powder for negative electrode layer was not deformed, then the surface was lightly compacted and flattened by a rod of diameter 11 mm. 25 mg of a powder for the positive electrode layer was inserted thereon, all of the powder was leveled such that the pre-inserted powders for the negative electrode layer and the solid electrode layer were not deformed, then an upper die of diameter 11 mm was mounted thereon.

Heating was performed up to 600° C. while pressing the die of diameter 11 mm of a tableting device at a pressure of 2 tons by a hydraulic press, followed by releasing the pressure and allowing to cool to room temperature, thereby obtaining a sample of an all-solid secondary battery.

Evaluation of Samples

Figure 6:
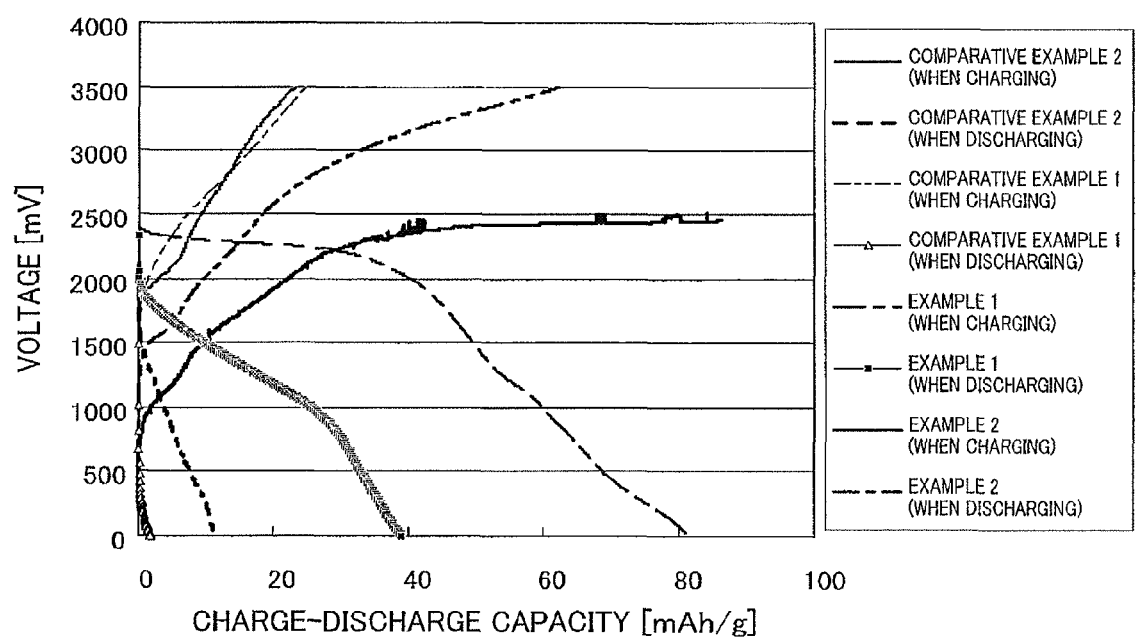
FIG. 6 is a graph that shows the results of charge-discharge test of the all-solid secondary batteries in Examples 47 to 50 of the present invention.

The resulting samples were placed in a constant-temperature bath at 60° C. and a charge-discharge test was performed. Here, a charge-discharge rate was set to 1/20 C, constant current charging was performed up to 4.5 V, and constant current discharging was performed after maintaining at an open circuit voltage for 2 minutes. At this time, the cut-off voltage was set at 0.05 V. The results of the charge-discharge test are shown in Table 7 and FIG. 6.

TABLE 7

| | Lithium ion conductive inorganic substance | Charge-discharge capacity [mAh/g] (when charging) | Charge-discharge capacity [mAh/g] (when discharging) |
|---|---|---|---|
| Example 47 | $Li_{1.55}Al_{0.2}Zr_{1.7}Y_{0.1}Si_{0.25}P_{2.75}O_{12}$ | 62.465 | 38.890 |
| Example 48 | $Li_{1.44}Al_{0.2}Ti_{1.08}Zr_{0.68}Y_{0.04}Si_{0.2}P_{2.8}O_{12}$ | 86.074 | 81.690 |
| Example 49 (Comparative Example) | $Li_{1.3}Al_{0.3}Ti_{1.7}(PO_4)_3$ (LATP) | 24.867 | 1.8723 |
| Example 50 (Comparative Example) | $LiZr_2(PO_4)_3$ (LZP) | 23.294 | 11.639 |

As a result, the all-solid secondary batteries in Examples 47 and 48 have a charge-discharge capacity of 30 mAh/g or higher, more specifically 60 mAh/g or higher, thus it is demonstrated that they have a high charge-discharge capacity. On the other hand, the charge-discharge capacities of the samples of Examples 49 and 50 as reference examples of the present invention were less than 30 mAh/g. It is therefore demonstrated that the all-solid secondary batteries in Examples 47 and 48 have a charge-discharge capacity higher than those of Examples 49 and 50.

It is demonstrated from the results described above that the all-solid secondary batteries in the Examples of the present invention can achieve higher charge-discharge capacity by way of containing a predetermined amount of $ZrO_2$ component. It is surmised that the ion conductivity is enhanced by maintaining a crystal structure similar to that of LATP having a higher electrical conductivity and the reduction resistance of the inorganic electrolyte is improved by Zr atoms.

Although embodiments of the present invention are explained in detail for the purpose of exemplification as above, the present invention is not limited to the embodiments. Those skilled in the art may make many modifications without departing from the spirit and scope of the present invention, and which are also encompassed by the present invention.

What is claimed is:

1. A lithium ion conductive inorganic substance, comprising:
   a $ZrO_2$ component from 10.0% to 52.0% by mass on an oxide basis; and
   a crystalline phase of $Li_{1+x+z}M_xA_{2-x}P_{3-z}Si_zO_{12}$, wherein $0 < X \leq 1$, $0 < Z < 1$, M: at least one selected from Al, Sc, Y, Ga, and La, and A: at least one selected from Ti, Zr, Ge, and Sn.

2. The lithium ion conductive inorganic substance according to claim 1, wherein the lithium ion conductive inorganic substance is a glass ceramic.

3. The lithium ion conductive inorganic substance according to claim 1, wherein the lithium ion conductive inorganic substance is a ceramic.

4. The lithium ion conductive inorganic substance according claim 1, further comprising a $Li_2O$ component from 3.0% to 9.5%, a $P_2O_5$ component from 24% to 55%, an $AO_2$ component from 21% to 51%, and a $M_2O_3$ component greater than 0% and no greater than 24% by mass on an oxide basis (A: at least one selected from Zr, Ti, Ge, and Sn, and M: at least one selected from Al, Y, Sc, Ga, and La).

5. The lithium ion conductive inorganic substance according claim 1, wherein the content of an $SiO_2$ component is no greater than 18% by mass on an oxide basis.

6. The lithium ion conductive inorganic substance according claim 1, wherein a mass ratio on an oxide basis of $Y_2O_3/(ZrO_2+Y_2O_3)$ from 0.001 to 0.14 or $Sc_2O_3/(ZrO_2+Sc_2O_3)$ from 0.001 to 0.10 is satisfied.

7. The lithium ion conductive inorganic substance according to claim 1, wherein a lithium ion conductivity at 25° C. is no less than $1.0 \times 10^{-7}$ S·cm$^{-1}$.

8. The lithium ion conductive inorganic substance according to claim 1, wherein a potential with respect to Li at 25° C. is no less than 0.3 V and no greater than 1.5 V and a current density of a reduction current is less than 10 μA/cm$^2$.

9. A lithium ion secondary battery, comprising a positive electrode layer, a negative electrode layer, and a solid electrolyte layer that intervenes between the positive electrode layer and the negative electrode layer, and that comprises a solid electrolyte formed from the lithium ion conductive inorganic substance according to claim 1.

10. A solid electrolyte used for primary batteries or secondary batteries, having a thickness from 0.5 μm to 1000 μm and comprising the lithium ion conductive inorganic substance according claim 1.

11. The lithium ion conductive inorganic substance according to claim 1, wherein the content of an $ZrO_2$ component is from 10.4 to 52.0% by mass on an oxide basis.

\* \* \* \* \*